(12) United States Patent
Mason

(10) Patent No.: US 7,089,330 B1
(45) Date of Patent: Aug. 8, 2006

(54) SYSTEM AND METHOD FOR TRANSFORMING CUSTOM CONTENT GENERATION TAGS ASSOCIATED WITH WEB PAGES

(75) Inventor: Larry P. Mason, Corinth, TX (US)

(73) Assignee: i2 Technologies US, Inc., Dallas, TX (US)

( * ) Notice: Subject to any disclaimer, the term of this patent is extended or adjusted under 35 U.S.C. 154(b) by 759 days.

(21) Appl. No.: 09/675,780

(22) Filed: Sep. 28, 2000

(51) Int. Cl.
*G06F 15/16* (2006.01)

(52) U.S. Cl. ............... 709/246; 709/203; 709/218; 709/229; 709/231; 715/501.1; 715/513; 715/522; 715/523; 707/5; 707/10

(58) Field of Classification Search ........... 709/203, 709/208, 218, 229, 231, 246; 707/5, 10, 707/522, 513; 715/513, 523, 501.1, 522; 345/731
See application file for complete search history.

(56) References Cited

U.S. PATENT DOCUMENTS

| | | | |
|---|---|---|---|
| 5,987,480 A | 11/1999 | Donohue et al. | 707/501 |
| 6,052,710 A | 4/2000 | Saliba et al. | 709/203 |
| 6,122,657 A | 9/2000 | Hoffman, Jr. et al. | 709/201 |
| 6,195,694 B1 | 2/2001 | Chen et al. | 709/220 |
| 6,237,005 B1 | 5/2001 | Griffin | 707/102 |
| 6,263,332 B1* | 7/2001 | Nasr et al. | 707/5 |
| 6,314,451 B1 | 11/2001 | Landsman et al. | 709/203 |
| 6,535,896 B1* | 3/2003 | Britton et al. | 715/523 |
| 6,654,784 B1* | 11/2003 | Wei | 709/203 |
| 6,654,949 B1* | 11/2003 | Fraenkel et al. | 717/130 |
| 6,675,354 B1* | 1/2004 | Claussen et al. | 715/513 |
| 2001/0049702 A1* | 12/2001 | Najmi | 707/513 |
| 2002/0035579 A1* | 3/2002 | Wang et al. | 707/513 |
| 2002/0120685 A1* | 8/2002 | Srivastava et al. | 709/203 |
| 2002/0122054 A1* | 9/2002 | Hind et al. | 345/731 |
| 2002/0143821 A1* | 10/2002 | Jakubowski | 707/522 |
| 2002/0169851 A1* | 11/2002 | Weathersby et al. | 709/218 |
| 2002/0178290 A1* | 11/2002 | Coulthard et al. | 709/246 |
| 2003/0023699 A1* | 1/2003 | Newsome | 709/208 |
| 2003/0217169 A1* | 11/2003 | James et al. | 709/231 |
| 2003/0226107 A1* | 12/2003 | Pelegri-Llopart et al. | 715/513 |
| 2004/0049574 A1* | 3/2004 | Watson et al. | 709/224 |

OTHER PUBLICATIONS

James Clark; "XSL Transformations (XSLT)," Version 1.0; http://www.w3.org/TR/xslt; downloaded Sep. 9, 2000; all, Nov. 16, 1999.

(Continued)

*Primary Examiner*—Saleh Najjar
*Assistant Examiner*—ThuHa Nguyen
(74) *Attorney, Agent, or Firm*—Brian E. Harris; James E. Walton

(57) ABSTRACT

A system (10) for transforming custom content generation tags (62) includes a web server (20) that receives a request (18) from a web browser (12). The request (18) identifies a file (24) that includes one or more custom content generation tags (62) that the web browser (12) is unable to interpret. The system (10) also includes a transformation engine (34) that receives the custom content generation tags (62) from the web server (20) and transforms the tags (62) into first output that the web browser (12) is able to interpret. The transformation engine (34) communicates the first output to the web server (20) and the web server (20) communicates the first output to the web browser (12) in response to the request (18).

23 Claims, 5 Drawing Sheets

OTHER PUBLICATIONS

Java Software; "JavaServer Pages™ Specification;" Version 1.0; all, Sep. 27, 1999.

Java Software; "JavaServer Pages™ Specification;" Version 1.1; all, Nov. 30, 1999.

* cited by examiner

```
<HTML>

<%@ taglib uri="/tlds/i2.tld" prefix="i2" %>        /52a
<%@ page language="java" imports="java.util.*" %>
                                                     52b
<H1>Test Page</H1>      /64

<P>Today is</P>     /64

<jsp:useBean id="clock" class="jspCalendar" />
                                               54
<UL>    /64
<LI>Day: <%=clock.getDayOfMonth() %>  ]
<LI>Year: <%=clock.getYear() %>       } 56

</UL>    64
<%--Check for AM or PM--%>
<%! int time=Calendar.getInstance().get(Calendar.AM_PM); %>   /58

<%
if(time==Calendar.AM) {
%>
Good Morning
<%
}
else{
%>
Good Afternoon                        } 60
<%
}
%>

<P>Try this test button</P>    /64
<i2:button onclick="javascript:alert('OUCH-stop that!')">Click Me</i2:button>
                                                                              62
<HTML>
```

FIG. 2

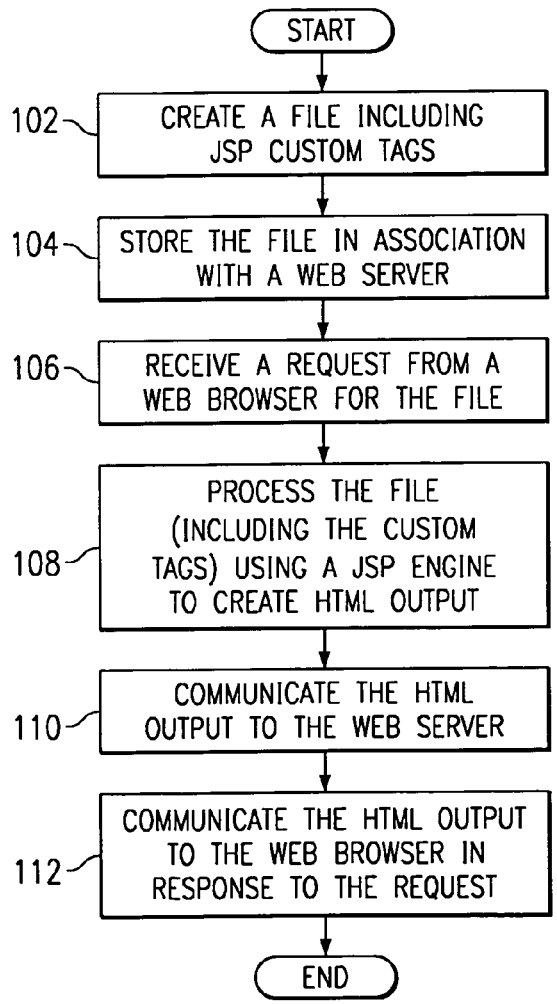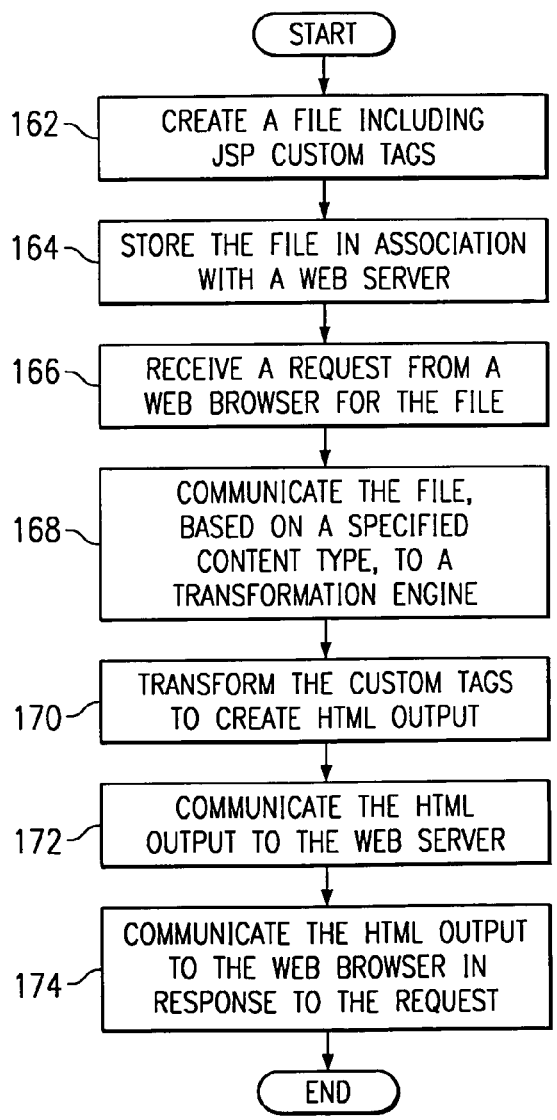

*FIG. 4*

```
<xsl:stylesheet
xmlns:xsl = "http://www.w3.org/1999.XSL/Transform"
xmlns:i2 = "http://www.i2.com"
exclude-result-prefixes = "i2"
result-ns = " ">                                    } 70

<xsl:output method = "html"/>

<xsl:template match="/">
  <xsl:apply-templates />       } 72a
<xsl:template>       ←74

<xsl:template match = "i2:button">
  <TABLE width = "65" border = "1" cellspacing = "0" cellpadding = "2">
   <TR>
    <TD class = "buttonText" nowrap = "yes">             } 76
     <A class = "buttonText">
      <xsl:attribute name = "href">
       <xsl:value-of select = "@onclick"/>    } 78
      </xsl:attribute>
      <xsl:value-of select = "."/>
     </A>
    </TD>                     } 76
   </TR>
  </TABLE>
</xsl:template>

</xsl:stylesheet
```

*FIG. 5*

```
<TABLE width = "65" border = "1" cellspacing = "0" cellpadding = "2">
 <TR>
  <TD class = "buttonText" nowrap = "yes">
   <A class = "buttonText" href="javascript:alert('OUCH-stop that!')">Click Me</A>
  </TD>
 </TR>
</TABLE>
```

SYSTEM AND METHOD FOR TRANSFORMING CUSTOM CONTENT GENERATION TAGS ASSOCIATED WITH WEB PAGES

BACKGROUND OF THE INVENTION

With the increasing popularity of the Internet, technologies for creating and delivering web pages to users are continuously being developed and refined. Web pages that have static content can be created relatively easily using Hypertext Markup Language (HTML) to define the content of the pages. However, it is more difficult to create dynamic page content that is based on a user request, system status, or other input. One solution has been to use "servlets," such as JAVA servlets, to dynamically create web page content. JAVA servlets are JAVA programs that execute at a web server (as opposed to an "applet," which executes in a web browser) and that receive a HyperText Transfer Protocol (HTTP) request, dynamically generate a response to the request, and communicate the response to the web browser in the form of an HTML file. When using this approach, however, the entire web page (the HTML file) must be created by the servlet. Therefore, if a web page developer wishes to modify the appearance of the web page, the developer must access, edit, and recompile the servlet. This is true even if the developer only wants to change the formatting of the web page and does not want to change the logic of the program and the content that the logic creates.

Certain technologies have begun to be developed to separate the application logic from the appearance of the web page and to allow the appearance of the page to be changed without having to access the logic that creates the content. An example of such technology is the JAVASERVER PAGE (JSP) technology. A JSP file is basically an HTML file that includes additional components that execute application logic to generate content. Using JSP technology, web page developers use HTML or Extensible Markup Language (XML) tags to design and format a web page. In addition to the HTML and XML tags, the JSP file also includes JSP tags and/or scriptlets that generate content in the web page. The application logic that generates the content may be included in JAVA programs, such as JAVABEANS, that are executed at the web server using the JSP tags. The HTML and XML tags are used to format the content produced by the JSP tags and scriptlets, such that the appearance of the page may be changed by modifying the HTML or XML tags without having to modify the underlying JAVA programs that are generating the content.

In addition to the standard JSP tags that are defined in the JSP specification, the current version of JSP allows for the use of custom tags. Custom tags give the web page developer even greater flexibility in the design of web pages. Although custom JAVA code may be included in JSP files as scriptlets that create content, custom tags can be used to create this same content by executing separate JAVA applications. Therefore, instead of having to include JAVA code in the JSP file, the developer only has to include a custom tag and a minimal amount of supporting code. The use of custom tags allows for the further separation of the content generation and page formatting tasks of developing a web page. Unfortunately, custom tags have not been available in previous version of JSP, and developers using these earlier versions have not been able to take advantage of custom tags.

SUMMARY OF THE INVENTION

According to the present invention, disadvantages and problems associated with previous techniques for processing document tags have been substantially reduced or eliminated.

According to one embodiment of the present invention, a system for transforming custom content generation tags includes a web server that receives a request from a web browser. The request identifies a file that includes one or more custom content generation tags that the web browser is unable to interpret. The system also includes a transformation engine that receives the custom content generation tags from the web server and transforms the custom content generation tags into first output that the web browser is able to interpret. The transformation engine communicates the first output to the web server and the web server communicates the first output to the web browser in response to the request.

The system and method of the present invention provide a number of important technical advantages. The use of custom or other content generation tags in files that generate web pages allows for the appearance and formatting of content produced by the tags to be modified without actually modifying the logic generating the content. For example, JSP 1.1 allows for the use of custom tags to create content in web pages. However, previous versions of JSP (such as JSP 1.0) do not provide for these custom tags (these versions are not "forward compatible"). Therefore, the ability of individuals and businesses using earlier versions of JSP to create and host web pages has been hampered. For example, these individuals and businesses are unable to use the extensive libraries of custom tags that are being created to easily generate dynamic content on their web pages.

The present invention eliminates or reduces this problem by providing for the transformation of JSP custom tags or other types of custom tags to a format that can be processed by older versions of JSP and other web page hosting technologies. For example, JSP custom tags may be included in a JSP file that is to be processed using a JSP 1.0 engine. When the JSP file is requested by a web browser, the JSP file including the custom tags is sent to the JSP 1.0 engine. The JSP engine processes the portions of the JSP file that it understands (such as scriptlets and standard JSP tags) and then communicates the results of the processing and the unprocessed custom tags to a transformation engine. The transformation engine is used to transform the custom tags into HTML, XML, or other appropriate code that can be interpreted using a web browser. Alternatively, any other type of file including JSP or other custom tags may be communicated to the transformation engine to transform the custom tags. Therefore, even if an individual or business that hosts web pages does not have an engine capable of interpreting custom tags, the individual or business can still incorporate custom tags in their web pages and benefit from the advantages of custom tags. Techniques incorporating one or more of these or other advantages are well suited to a variety of web page development, hosting, and processing environments. Other technical advantages are readily apparent to those skilled in the art from the following figures, descriptions and claims.

BRIEF DESCRIPTION OF THE DRAWINGS

To provide a more complete understanding of the present invention and the features and advantages thereof, reference is made to the following description taken in conjunction with the accompanying drawings, in which:

FIG. 2 illustrates an exemplary JSP page that may be included in a JSP file;

FIG. 3 illustrates an exemplary method of providing web pages that include custom tags to a web browser using a JSP engine;

FIG. 4 illustrates an exemplary XSL stylesheet used to transform custom tags;

FIG. 5 illustrates exemplary HTML code included in the output from a transformation engine;

FIG. 7 illustrates an exemplary method of providing web pages including custom tags to web browser without using a JSP engine.

DETAILED DESCRIPTION OF THE INVENTION

Figure 1:
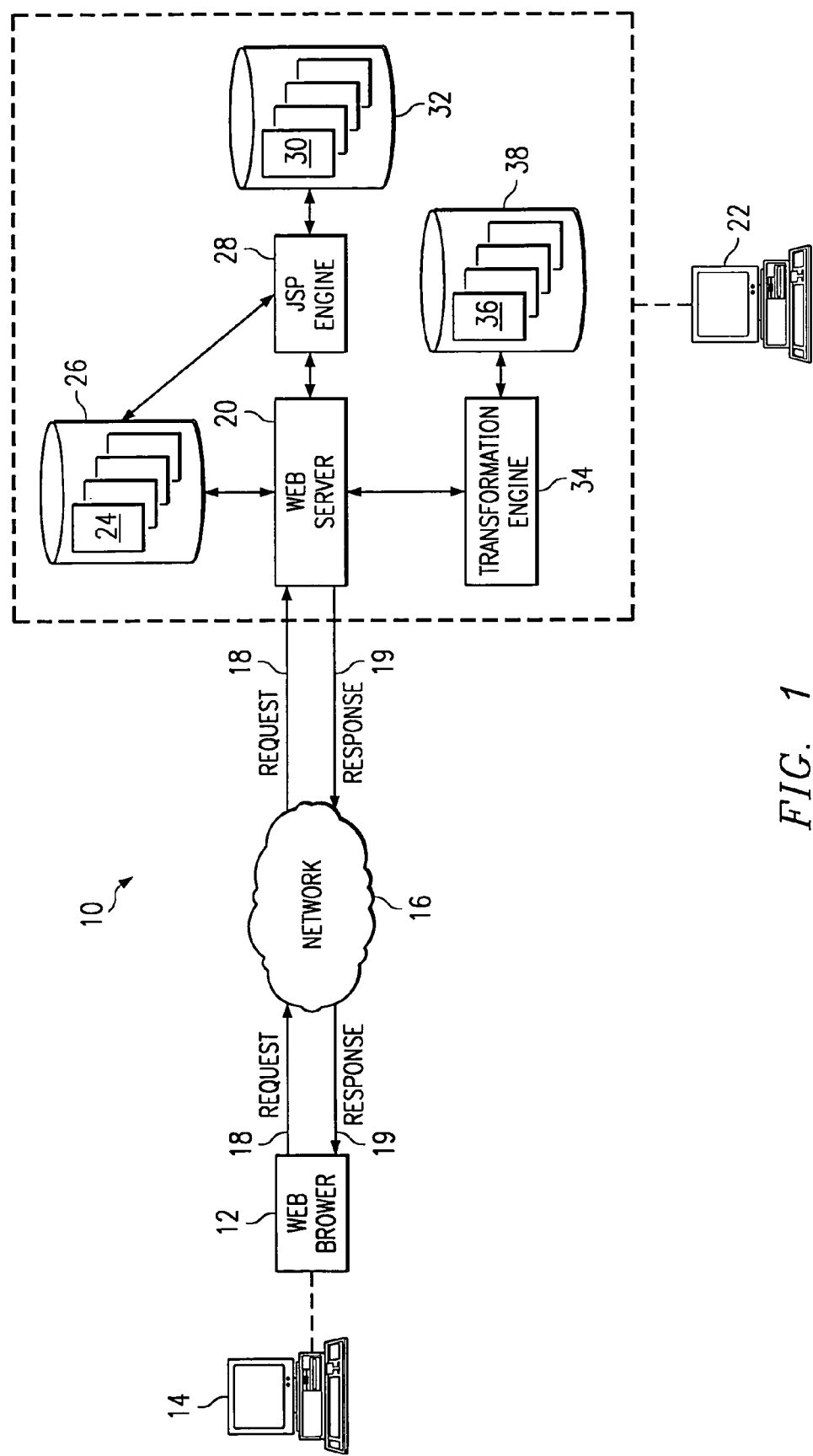
FIG. 1 illustrates an exemplary system for transforming custom tags in a web page.

FIG. 1 illustrates an exemplary system 10 for transforming custom tags in a web page. System 10 includes a web browser 12 executing on one or more computers 14 at one or more locations. Browser 12 is coupled to a communications network 16 and may include any suitable HTTP (HyperText Transfer Protocol) client or other appropriate software and/or hardware for receiving web pages or other data using network 16. For example, browser 12 may include software such as INTERNET EXPLORER by MICROSOFT CORPORATION or NETSCAPE COMMUNICATOR by NETSCAPE COMMUNICATIONS CORPORATION. Browser 12 may generate one or more content requests 18 for web pages or other content in response to input from a user associated with browser 12. For example, browser 12 may generate an HTTP request 18 that includes a Uniform Resource Locator (URL) portion identifying the requested item of content and a header portion containing further information about HTTP request 18.

System 10 also includes a web server 20. Server 20 is coupled to network 16 and may include any suitable HTTP server or other appropriate software and/or hardware for communicating web pages or other data to one or more browsers 12 using network 16. Network 16 may include the Internet, a wide area network (WAN), a local area network (LAN), or any other appropriate wireline or wireless network or networks. Browser 12 may communicate a request 18, as described above, to server 20 using communication network 16. Such a request may indicate a desire to receive a file from server 20. For example, server 20 may have access to and be able to provide one or more files 24 stored in database 26 (and identified by a URL according to where they are stored).

Although files 24 may include any appropriate files that may be communicated to browser 12 or that may be used to create content for communication to browser 12, an exemplary type of file 24 is a JAVASERVER PAGE (JSP) file. A JSP file is basically a HyperText Markup Language (HTML) file that includes additional components that execute application logic to generate dynamic content. Using JSP technology, web page developers use HTML and/or Extensible Markup Language (XML) tags to design and format a web page. In addition to the HTML and XML tags, the JSP file also includes JSP tags and/or scriptlets that generate content in the web page. The HTML and XML tags in the JSP file 24 are used, in part, to format the content generated by the JSP tags and scriptlets.

JSP files 24 may be text files including the various tags and scriptlets, servlets or "JSP page implementation classes," or any other appropriate file formats. When server 20 receives a request for a JSP file 24, server 20 accesses the file 24 in database 26 and loads the file 24 to a JSP engine (or container) 28. Although JSP engine 28 is primarily described, the present invention contemplates any suitable web page processing engine. JSP engine 28 may be implemented as software and/or hardware that is a part of or separate from web server 20. JSP engine 28 is used to interpret the JSP tags and scriptlets to generate content. A JSP file 24 may instruct JSP engine 28 to generate content using a variety of techniques. For example, JSP standard content generation tags (or "standard tags") in a file 24 may instruct JSP engine 28 to access and instantiate JAVABEAN or Enterprise JAVABEAN components, set and retrieve bean attributes, download applets, access a database to retrieve data (for example, using JDBC objects), use Remote Method Invocation (RMI) objects, and/or include one or more files. The JAVABEAN or ENTERPRISE JAVABEAN components, applets, JDBC and RMI objects, files to be included, and other appropriate files used by JSP engine 28 (all of which will be generally referred to as files 30) may be stored in a database 32 coupled to JSP engine 28. In addition to processing JSP tags, JSP engine 28 may execute JAVA or other scriptlets in a JSP file 24 to generate content or may use any other appropriate technique for generating content.

In addition to JSP standard tags and scriptlets, JSP files 24 may include one or more JSP custom content generation tags (or "custom tags"). Although custom JAVA code can be included in JSP files 24 as one or more scriptlets that create content, custom tags can be used to create this same content by executing JAVA applications that are separate from file 24. Therefore, instead of having to include JAVA code in a JSP file 24, a web developer only has to include a custom tag and a minimal amount of supporting code. However, as described more fully below, not all JSP or other web page processing engines 28 are able to process custom content tags. Therefore, system 10 also includes a transformation engine 34 that transforms custom tags in a JSP or other file 24 into a format that can be interpreted by web browser 12. Transformation engine 34 performs this transformation using stylesheets 36 that may be stored in a database 38. Web server 20, JSP engine 28, and transformation engine 34 may each operate on one or more computers 22 at one or more locations. One or more of these components may also share a computer 22. Furthermore, databases 26, 32, and 38 may each include one or more storage locations and/or devices integral to or separate from one another and may use any appropriate techniques or components for storing files and other data.

FIG. 2 illustrates an exemplary JSP page 50 that may be included in a JSP file 24. Page 50 may include one or more directives 52, JSP standard tags (or actions) 54, expressions 56, declarations 58, scriptlets 60, JSP custom tags 62, or any other suitable components, in any suitable combination. Page 50 may also include HTML code 64 that formats the foregoing components and produces selected text on the web page generated using page 50. Directives 52 are instructions processed by JSP engine 28 when page 50 is compiled into a servlet for execution or is otherwise loaded to JSP engine 28. Directives 52 may be used, for example, to set instructions, specify custom tag libraries, and insert data from external files. For example, directive 52a is used to specify a custom tag library used by custom tag 62, described below. Directive 52b is used to define the language used in page 50 (JAVA) and to import the JAVA classes needed by the embedded JAVA code in page 50.

As described above, JSP standard tags 54 are used to perform a variety of functions, such as accessing and using JAVABEANS components. For example, exemplary tag 54 is used to initialize a JAVABEAN that is used in subsequent portions of page 50. Expressions 56 are variables or constants inserted in the data that JSP engine 28 returns to server 20 after processing page 50. In exemplary page 50, expressions 56 make calls on a JAVABEAN component and insert the resulting data (in this case, the day of the month and the year) into page 50. Declarations 58 are used to define variables for use in expressions 56 or scriptlets 60. In page 50, the exemplary declaration 58 initializes a time variable and assigns a value to the variable. Scriptlets 60 are blocks of JAVA code that are executed verbatim by JSP engine 28. The exemplary scriptlet 60 determines the time of day and generates an appropriate greeting (either "Good Morning" or "Good Afternoon").

Page 50 also includes an exemplary custom tag 62 that instructs JSP engine 28 to generate a button. As described above, custom tags 62 extend the capabilities of JSP to allow web page developers to define tags and the content that the tags should generate. Although the button could be created by directly inserting HTML code or a JAVA scriptlet 60 into page 50, the use of custom tag 62 helps to separate the content generation and formatting tasks of creating a JSP page 50. For example, instead of having to know how to generate certain content using HTML, JAVA, or other appropriate code, an unsophisticated web page developer can simply insert a custom tag 62 and a directive 52 specifying a tag library that defines the custom tag 62. Custom tag 62 may be expressed in an XML or "XML-like" format.

Exemplary page 50 includes a taglib directive 52a that identifies the location of a tag library descriptor (i2.tld) and defines a tag attribute (prefix='i2'). A tag library descriptor is an XML file that defines a custom tag 62 and that connects it to an associated tag handler class. A tag library descriptor includes the various attributes of the tag 62, the name and location of the tag handler class, and any information that JSP engine 28 needs to process the custom tag 62. A tag handler class is a JAVA class (compiled JAVA source code) that executes the operations associated with the custom tag 62. For example, to process custom tag 62 in exemplary page 50, a JAVA class is used to create a graphical button that, when clicked, generates "OUCH—stop that" as synthesized speech. One skilled in the art will understand how to create custom tags 62 and the associated tag library descriptors and tag handler classes, so the contents of these components will not be described in further detail.

FIG. 3 illustrates an exemplary method of providing web pages that include custom tags 62 to web browser 12. This method assumes that JSP engine 28 is capable of processing custom tags 62 to generate content. The method begins at step 102 with the creation of a file 24 that includes JSP or other custom tags 62, as described above. At step 104, file 24 is stored in database 26. Server 20 receives a request 18 for file 24 from web browser 12 at step 106. At step 108, file 24 is loaded to JSP engine 28 and JSP engine 28 processes file 24 to create HTML or other appropriate output. This processing includes the processing of custom tags 62 to generate content as described above. JSP engine 28 communicates the HTML or other output to server 20 at step 110, server 20 communicates the output to browser 12 at step 112 as a response 19 to request 18, and the method ends. The present invention also contemplates that JSP engine 28 may communicate the output directly to browser 12.

As described above, it can be very useful and easy to generate content in a web page using JSP custom tags 62. However, although current versions of JSP (such as JSP 1.1) provide for the use of custom tags 62, earlier versions of JSP (such as JSP 1.0) do not provide for the use of such tags. Therefore, web developers creating pages to be processed using an earlier version of JSP or using another type of web page processing software have not been able to incorporate custom tags 62 in their web pages. Furthermore, other types of custom tags besides JSP custom tags 62 have also been developed. As with JSP custom tags 62, these other types of custom tags are not able to be used without the particular processing engine for which the tags were developed. As with JSP custom tags 62, these other types of custom tags may be XML or "XML-like" tags. All custom tags, whether developed for JSP or other appropriate software or hardware, will be referred to as custom tags 62.

Referring again to FIG. 1, the present invention addresses the problem of not being able to use custom tags 62 without having a specific processing engine by providing transformation engine 34 that transforms custom tags 62 in a JSP or other file 24 into a format that can be interpreted by web browser 12. Transformation engine 34 may be implemented as software and/or hardware that is a part of or separate from web server 20 and/or JSP engine 28. As an example only, and not by way of limitation, transformation engine 34 may be an Extensible Stylesheet Language Transformation (XSLT) engine or processor. Transformation engine 34 may transform a custom tag 62 to HTML, XML, or any other appropriate type of code (such as Wireless Markup Language, Vector Markup Language, and Scalable Vector Graphics). XSLT is a part of the Extensible Stylesheet Language (XSL) and is typically used to transform the structure of an XML document into another data format (either another form of XML or another type of data, such as HTML). Since custom tags 62 are written in XML or XML-like code, XSLT may also be used to transform custom tags 62 in a file 24.

FIG. 4 illustrates an exemplary XSL stylesheet 36 used to transform custom tags 62. In an exemplary embodiment, transformation engine 34 uses one or more XSL stylesheets 36 (which may be written in XSLT) to transform custom tags 62 into an appropriate format for interpretation by browser 20. Transformation engine 34 reads a file 24 that includes custom tags 62 and follows the instructions in one or more stylesheets 36 to transform custom tags 62.

Exemplary stylesheet 36 begins with a processing instruction 70 that indicates to transformation engine 34 the type of transformation that is to occur. The exemplary processing instruction 70 indicates the version of the XSL standard that is used and that the transformation is to produce HTML output. Stylesheet 36 also includes one or more templates 72 that may each be used to transform a particular custom tag 62 into HTML or other appropriate code. The first template, template 72a, applies to the entire file 24 to be transformed (as indicated by the "/" in the first line). The apply-templates element 74 of template 72a identifies the portions of file 24 that transformation engine 34 is to examine. Exemplary element 74 indicates that the entire file 24 is to be examined (as indicated by the "/" in element 74).

The next template in stylesheet 36, template 72b, applies to exemplary custom tag 62 in the JSP page 50 illustrated in FIG. 3. This applicability is indicated by including the name of custom tag 62 (i2:button) in the first line of template 72b. Template 72 includes HTML code 76 and XSL elements 78 that generate a text string formatted according to portions of HTML code 76. XSL elements 78 include an attribute element that assigns an attribute name and value and inserts the name and value into the output produced by transformation engine 34. The name of the attribute is assigned in the first line of the attribute element. In the exemplary stylesheet 36, the name assigned is "href". The value of the attribute is given by the contents of the attribute element (as identified by the xsl:value-of element). The "1" indicates that the value of href is the value of an attribute of custom tag 62 (in this case, the value of onclick). Referring to the exemplary JSP page 50 illustrated in FIG. 3, the value given to the onclick attribute of the i2:button custom tag 62 is as follows: "javascript:alert('OUCH—stop that!')">Click Me". Therefore, this text string is assigned as the value of the href attribute. The end result of the processing of XSL elements 78 is the insertion of the following text string in the output produced by transformation engine 34: href="javascript:alert('OUCH—stop that!')">Click Me". Following the XSL elements 78 are additional HTML tags 76 used to format the output generated by XSL elements 78.

The result of processing a file 24 including custom tags 62 using transformation engine 34 may be that each of the custom tags 62 is replaced with HTML or other appropriate code included within templates in an XSL stylesheet 36. In the exemplary JSP page 50 illustrated in FIG. 3, there is a single custom tag 62. This custom tag has a corresponding template 72*b* in the exemplary style sheet 36. Therefore, when JSP page 50 is processed using transformation engine 34, the exemplary custom tag 62 is replaced in the output from transformation engine 34 with the HTML code 76 in template 72*b* and the text generated by XML elements 78 in template 72*b*, as described above.

FIG. 5 illustrates exemplary HTML code 80 that may be included in output produced by transformation engine 34. HTML code 80 is generated when custom tag 62 in exemplary JSP page 50 is transformed using exemplary style sheet 36.

Although the exemplary custom tag 62 described above is used to produce presentation content (a button), custom tags 62 may also be used to generate other types of content. For example, a custom tag 62 may be used to call a component, such as a JAVA class, that accesses a database and generates content based on data retrieved from the database. Information from several sources (for example, databases) may be integrated into a web page using multiple custom tags 62. For instance, if an operator of an electronic business-to-business ("B2B") marketplace wishes to provide a web page that includes information about a contract between two parties, the file 24 used to generate the web page may include a custom tag 62 that accesses information about the contract in the first party's database, another custom tag 62 that accesses information about the contract in the second party's database, and yet another custom tag 62 that accesses information about the contract database operated by the marketplace operator that is facilitating the contract. The information gathered using these custom tags 62 may then be integrated in a web page to provide the parties or others with comprehensive and current information about the contract.

If a JSP or other engine 28 is not available to process such custom tags 62, then the tags 62 may be processed using transformation engine 34. However, since this type of database information is not static (unlike HTML code that may be used to generate a button), the custom tags 62 cannot be replaced with static HTML code included in a stylesheet 36, as described above. Therefore, instead of containing static HTML code or XSL elements that generate static HTML code, the template in stylesheet 36 that corresponds to each custom tag 62 may instead include code that is used to call a suitable component to access the appropriate database and generate HTML content based on the information retrieved from the database. Such a component may be the same as or similar to the component that a JSP engine 28 would call if a JSP engine 28 was used to process the custom tag 62. Stylesheet 36 may also include code to create dynamic content using any other appropriate techniques. Therefore, transformation engine 34 may be used to replace custom tags 62 with dynamic content, as well as with static content.

Figure 6:
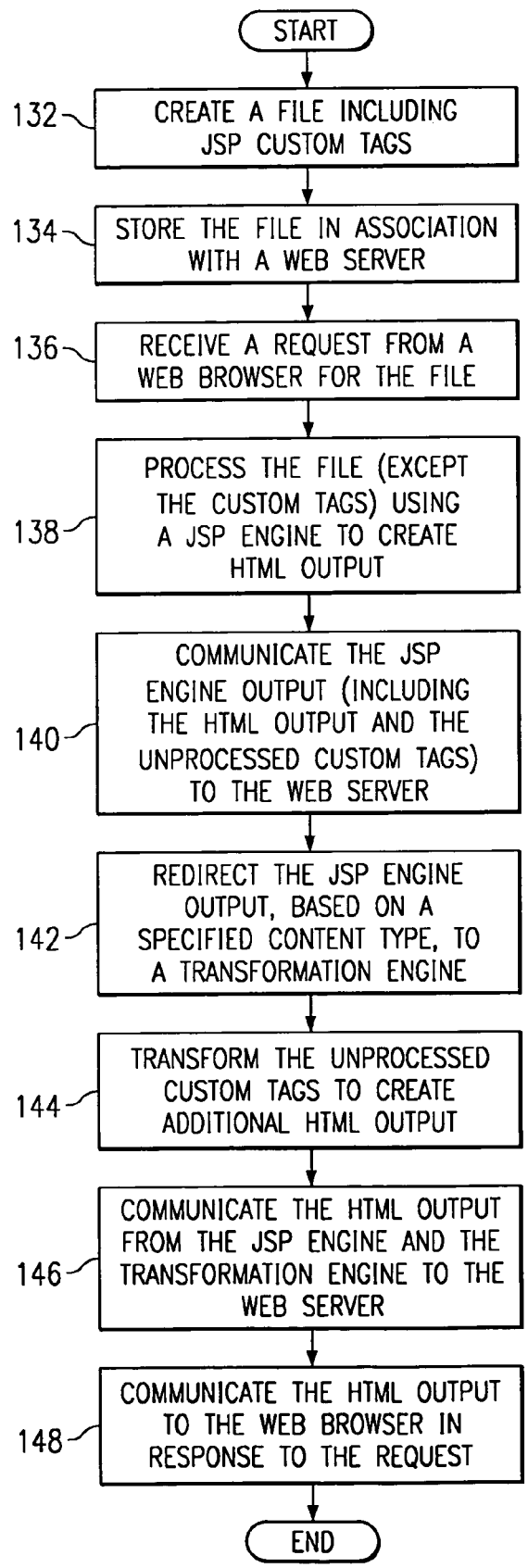
FIG. 6 illustrates an exemplary method of providing web pages including custom tags to a web browser using a JSP engine that is unable to process the custom tags.

FIG. 6 illustrates an exemplary method of providing web pages that include custom tags 62 to web browser 12 using a JSP engine 28 that is unable to process custom tags 62. Alternatively, JSP engine 28 may be any other appropriate type of web page processing engine that is unable to process custom tags 62. As an example only, and not by way of limitation, JSP engine 28 may be a JSP 1.0 engine. The method begins at step 132 with the creation of a file 24 that includes JSP or other custom tags 62, as described above. At step 134, file 24 is stored in database 26, which is associated with and accessible by web server 20. Server 20 receives a request 18 for file 24 from web browser 12 at step 136. At step 138, file 24 is loaded to JSP engine 28 (or any other appropriate type of engine) and JSP engine 28 processes file 24 to create HTML or other appropriate output. However, since JSP engine 28 is unable to process custom tags 62, custom tags are not processed and remain in the output produced by JSP engine 28 (JSP engine 28 is designed to pass custom tags 62 and other unrecognized tags to the output instead of generating an error message). Therefore, the output produced by JSP engine 38 may include HTML or other content that was originally included in file 24, HTML or other content that was generated by JSP engine 28 based on JSP standard tags and scriptlets in file 24, and the unprocessed custom tags 62. The processing by JSP engine 28 may also include adding a MIME (Multi-Purpose Internet Mail Extensions) header or other appropriate header or indicator to the output to indicate that the output includes unprocessed custom tags 62.

JSP engine 28 communicates the output including the unprocessed custom tags 62 to server 20 at step 140. Based on the MIME or other header indicating the presence of unprocessed custom tags 62, server 20 redirects the output to transformation engine 34 at step 142 instead of communicating the output to browser 12. Server 20 may redirect the output to transformation engine 34 by calling a servlet that includes or uses transformation engine 34. At step 144, transformation engine 34 processes the output from JSP engine 28 and transforms the unprocessed custom tags 62 using one or more stylesheets 36, as described above. In an exemplary embodiment, transformation engine 34 transforms custom tags 62 into HTML code. Therefore, the output produced by transformation engine 34 may include HTML or other content that was originally included in file 24, HTML or other content that was generated by JSP engine 28, and HTML or other content that was generated by transformation engine 34 by processing custom tags 62. Transformation engine 34 communicates this output to server 20 at step 146, server 20 communicates the output to browser 12 at step 148 as a response 19 to request 18, and the method ends. The present invention also contemplates that transformation engine 34 may communicate the output directly to browser 12.

FIG. 7 illustrates an exemplary method of providing web pages that include custom tags 62 to web browser 12 without using a JSP engine 28. Such a method may be used to process web pages that include custom tags 62, but that do not include any other JSP elements, such as JSP standard tags or scriptlets. The method begins at step 162 with the creation of a file 24 that includes JSP or other custom tags 62, as described above. The other contents of file 24 may include HTML or other code that may be interpreted by browser 12. File 24 may also include a MIME header or other appropriate header that indicates that file 24 includes custom tags 62. At step 164, file 24 is stored in database 26. Server 20 receives a request 18 for file 24 from web browser 12 at step 166. Server retrieves file 24 from database 26 and determines, based on the MIME header or other appropriate information, that file 24 includes custom tags 62 that should be transformed before file 24 or the output from file 24 is communicated to browser 12.

Based on this determination, server 20 communicates file 24 to transformation engine 34 at step 168. At step 170, transformation engine 34 processes file 24 and transforms custom tags 62 using one or more stylesheets 36, as described above. In an exemplary embodiment, transformation engine 34 transforms custom tags 62 into HTML code. Therefore, the output produced by transformation engine 34 may include HTML or other content that was originally included in file 24 and HTML or other content that was generated by transformation engine 34 by processing the custom tags 62. Transformation engine 34 communicates this output to server 20 at step 172, server 20 communicates the output to browser 12 at step 174 as a response 19 to request 18, and the method ends. Alternatively, transformation engine 34 may communicate the output directly to browser 12.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system for transforming custom content generation tags, comprising:
   a web server operable to receive a request from a web browser, the request identifying a file comprising one or more standard content generation tags and one or more custom content generation tags, both of which the web browser is unable to interpret;
   a web page processing engine operable to receive the standard content generation tags and the custom content generation tags and to transform the standard content generation tags into first output that the web browser is able to interpret, the web page processing engine unable to interpret the custom content generation tags;
   the web page processing engine further operable to communicate the first output and the custom content generation tags to the web server;
   a transformation engine operable to receive the custom content generation tags, transform the custom content generation tags into second output that the web browser is able to interpret, and communicate the second output to the web server; and
   the web server further operable to receive the second output and to communicate the first and second output to the web browser in response to the request.

2. The system of claim 1, wherein:
   the web server is operable to communicate the first output to the transformation engine with the custom content generation tags; and
   the transformation engine is operable to communicate the first output back to the web server with the second output.

3. The system of claim 1, wherein:
   the requested file comprises a JAVASERVER PAGE (JSP) file;
   the standard content generation tags comprise JSP standard tags;
   the custom content generation tags comprise JSP custom tags; and
   the web page processing engine comprises a JSP engine unable to process the JSP custom tags.

4. The system of claim 1, wherein the first and second output comprises code selected from the group consisting of HyperText Markup Language (HTML) code, Extensible Markup Language (XML) code, and Wireless Markup Language (WML) code.

5. The system of claim 1, wherein:
   the web page processing engine is operable to attach a header to the custom content generation tags, the header indicating the presence of the custom content generation tags; and
   the web server is operable to communicate the custom content generation tags to the transformation engine in response to the header.

6. The system of claim 1, wherein the transformation engine comprises an Extensible Stylesheet Language Transformation (XSLT) engine, the XSLT engine operable to transform the custom content generation tags using an Extensible Stylesheet Language (XSL) stylesheet.

7. The system of claim 6, wherein the XSL stylesheet comprises one or more templates corresponding to each custom content generation tag, the templates comprising HTML code to replace the corresponding custom content generation tag.

8. The system of claim 7, wherein one or more of the templates comprise code operable to generate HTML code to replace the corresponding custom content generation tag.

9. A method for transforming custom content generation tags, comprising:
   receiving a request from a web browser for a file comprising one or more standard content generation tags and one or more custom content generation tags, both of which the web browser is unable to interpret;
   processing the file using a web page processing engine to transform the standard content generation tags into first output that the web browser is able to interpret, the web page processing engine unable to interpret the custom content generation tags;
   transforming the custom content generation tags using a transformation engine into second output that the web browser is able to interpret; and
   communicating the first and second output to the web browser in response to the request.

10. The method of claim 9, further comprising communicating the first output to the transformation engine with the custom content generation tags, the first output being unaffected by the transformation engine.

11. The method of claim 9, wherein:
   the requested file comprises a JAVASERVER PAGE (JSP) file;
   the standard content generation tags comprise JSP standard tags;

the custom content generation tags comprise JSP custom
tags; and the web page processing engine comprises a JSP engine
unable to process the JSP custom tags.

12. The method of claim 9, wherein the first and second output comprises code selected from the group consisting of HyperText Markup Language (HTML) code, Extensible Markup Language (XML) code, and Wireless Markup Language (WML) code.

13. The method of claim 9, wherein:

the method further comprises attaching a header to the custom content generation tags, the header indicating the presence of custom content generation tags; and the custom content generation tags are communicated to the transformation engine in response to the header.

14. The method of claim 9, wherein the transformation engine comprises an Extensible Stylesheet Language Transformation (XSLT) engine, the XSLT engine operable to transform the custom content generation tags using an Extensible Stylesheet Language (XSL) stylesheet.

15. The method of claim 14, wherein the XSL stylesheet comprises one or more templates corresponding to each custom content generation tag, the templates comprising HTML code to replace the corresponding custom content generation tag.

16. The method of claim 15, wherein one or more of the templates comprise code operable to generate HTML code to replace the corresponding custom content generation tag.

17. Custom tag transformation software embodied in a computer-readable medium and operable to:

receive a request from a web browser for a file comprising one or more standard content generation tags and one or more custom content generation tags, both of which the web browser is unable to interpret;

process the file using a web page processing engine to transform the standard content generation tags into first output that the web browser is able to interpret, the web page processing engine unable to interpret the custom content generation tags;

transform the custom content generation tags into second output that the web browser is able to interpret; and communicate the first and second output to the web browser in response to the request.

18. The software of claim 17, wherein:

the requested file comprises a JAVASERVER PAGES (JSP) file;

the standard content generation tags comprise JSP standard tags;

the custom content generation tags comprise JSP custom tags; and the web page processing engine comprises a JSP engine unable to process the JSP custom tags.

19. The software of claim 17, wherein the first and second output comprises code selected from the group consisting of HyperText Markup Language (HTML) code, Extensible Markup Language (XML) code, and Wireless Markup Language (WML) code.

20. The software of claim 17, further operable to transform the custom content generation tags using an Extensible Stylesheet Language (XSL) stylesheet.

21. The software of claim 20, wherein the XSL stylesheet comprises one or more templates corresponding to each custom content generation tag, the templates comprising HTML code to replace the corresponding custom content generation tag.

22. The software of claim 21, wherein one or more of the templates comprise code operable to generate HTML code to replace the corresponding custom content generation tag.

23. A system for transforming custom content generation tags, comprising:

means for receiving a request from a web browser for a file comprising one or more standard content generation tags and one or more custom content generation tags, both of which the web browser is unable to interpret;

means for processing the file by transforming the standard content generation tags into first output that the web browser is able to interpret, the means for processing unable to interpret the custom content generation tags;

means for transforming the custom content generation tags into second output that the web browser is able to interpret; and means for communicating the first and second output to the web browser in response to the request.

* * * * *